(12) United States Patent
Chebolu et al.

(10) Patent No.: US 9,357,435 B2
(45) Date of Patent: May 31, 2016

(54) METHOD AND SYSTEM FOR HANDLING AUDIO PACKETS DURING A VOLTE CALL

(71) Applicant: Samsung Electronics Co., Ltd., Suwon-si, Gyeonggi-do (KR)

(72) Inventors: Praveen Chebolu, Bangalore (IN); Harsh Maheshchand Kothari, Bangalore (IN); Ganesh Babu Kamma, Bangalore (IN); Ajay Kumar Kabadi, Gadag (IN); Shaik Abdulla, Banagalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 75 days.

(21) Appl. No.: 14/255,304

(22) Filed: Apr. 17, 2014

(65) Prior Publication Data

US 2015/0124699 A1 May 7, 2015

(30) Foreign Application Priority Data

Nov. 6, 2013 (IN) .......................... 4990/CHE/2013

(51) Int. Cl.
*H04W 80/04* (2009.01)
*H04L 12/28* (2006.01)
*H04W 28/06* (2009.01)

(52) U.S. Cl.
CPC .................................... *H04W 28/06* (2013.01)

(58) Field of Classification Search
CPC .................................................... H04W 80/04
See application file for complete search history.

(56) References Cited

U.S. PATENT DOCUMENTS

| | | | | |
|---|---|---|---|---|
| 2001/0032254 A1* | 10/2001 | Hawkins | ............. | G06F 17/3089 709/219 |
| 2003/0103513 A1* | 6/2003 | Hans | ....................... | H04L 29/06 370/410 |
| 2004/0095939 A1* | 5/2004 | Yang | ....................... | H04L 29/06 370/395.52 |
| 2006/0268820 A1* | 11/2006 | Mahkonen | ............ | H04W 28/06 370/349 |
| 2007/0047551 A1 | 3/2007 | Conner et al. | | |
| 2007/0098016 A1 | 5/2007 | Kapoor et al. | | |
| 2008/0025312 A1* | 1/2008 | Kuppuswamy | ....... | H04W 28/06 370/392 |
| 2008/0101220 A1* | 5/2008 | Kim | ...................... | H04L 12/189 370/229 |
| 2008/0151901 A1* | 6/2008 | Yang | ..................... | H04L 1/0079 370/394 |
| 2009/0022107 A1* | 1/2009 | Kapoor | ................... | H04L 69/04 370/331 |
| 2009/0034529 A1* | 2/2009 | Dawdy | ................. | H04L 45/302 370/392 |
| 2009/0080422 A1* | 3/2009 | Lee | ....................... | H04W 28/06 370/389 |
| 2010/0205497 A1* | 8/2010 | Li | .......................... | H04L 69/22 714/746 |
| 2011/0019695 A1* | 1/2011 | Wu | ....................... | H04W 28/06 370/477 |
| 2011/0090804 A1* | 4/2011 | Wusirika | ............ | H04L 41/0806 370/252 |
| 2012/0230284 A1 | 9/2012 | Yi et al. | | |

* cited by examiner

*Primary Examiner* — Andrew Lee
(74) *Attorney, Agent, or Firm* — Jefferson IP Law, LLP (57) ABSTRACT

A method and a system for handling audio packets in a Voice over Long Term Evolution (VoLTE) call by a User Equipment (UE) when Robust Header Compression (ROHC) is enabled are provided. The Transmission Control Protocol/Internet Protocol (TCP/IP) layer provides the VoLTE call properties to the ROHC compressor. The TCP/IP layer receives the audio packets from audio engine and sends the Real-time Transport Protocol (RTP) packets to a ROHC compressor. Further, the ROHC compressor compresses the Internet Protocol/User Datagram Protocol (IP/UDP) headers and a RTP header. The ROHC compressor sends the compressed RTP data along with a payload to the network in the UpLink (UL) data path. During DownLink (DL) data path, ROHC decompressor receives compressed ROHC packet from network. The ROHC decompressor ignores the construction of IP/UDP headers for the compressed data.

17 Claims, 6 Drawing Sheets

METHOD AND SYSTEM FOR HANDLING AUDIO PACKETS DURING A VOLTE CALL

CROSS-REFERENCE TO RELATED APPLICATION(S)

This application claims the benefit under 35 U.S.C. §119(a) of an Indian patent application filed on Nov. 6, 2013 in the Indian Intellectual Property Office and assigned Serial number 4990/CHE/2013, the entire disclosure of which is hereby incorporated by reference.

TECHNICAL FIELD

The present disclosure relates to wireless communications. More particularly, the present disclosure relates to a method and system for handling audio packets during a Voice over Long Term Evolution (VoLTE) call.

BACKGROUND

Wireless communication systems are widely deployed for providing various telecommunication services such as telephony, video, data, messaging, broadcasts and so on. Wireless communication systems employ multiple-access technologies capable of supporting communication with multiple users by sharing available system resources (for example, bandwidth, transmit power and so on). Some examples of such multiple-access technologies include Code Division Multiple Access (CDMA) systems, Time Division Multiple Access (TDMA) systems and so on.

Various access technologies are adopted in various telecommunication standards to provide a common protocol that enables different wireless devices for communication. The Internet Protocol (IP) Multimedia Subsystem (IMS) network is defined by the Third Generation Partnership Project (3GPP) to provide IP Multimedia services over mobile communication networks. The IMS network provides key features to enrich the end-user person-to-person communication experience through the integration and interaction of services. The IMS network allows new rich person-to-person (client-to-client) as well as person-to-content (client-to-server) communications over an IP-based network. The IMS network makes use of the Session Initiation Protocol (SIP) to set up and control calls or sessions between user terminals or User Equipments (UEs).

Because the IMS network is standardized by the 3GPP for IP based multimedia services, the GSM Association (GSMA) recognized IMS networks as a means to provide voice services over a Long Term Evolution (LTE) network, termed as Voice over Long Term Evolution (VoLTE). Further, VoLTE is emerging as a solution to support real time voice traffic in IP networks.

During a VoLTE call, most of the Internet Protocol/User Datagram Protocol (IP/UDP) header fields are static (fixed) until the call is ended. In an existing system, during a VoLTE call, the UE encodes the IP/UDP headers with the received audio packets and sends the data to a RObust Header Compression (ROHC) module for compression. The ROHC compressor decodes the IP/UDP headers for finding the ROHC context to compress the data during an UpLink (UL) data path.

In DownLink (DL) data path, the ROHC decompressor decodes the ROHC packet and constructs IP/UDP header and then sends the packet to the Transmission Control Protocol/Internet Protocol (TCP/IP) layer. The TCP/IP layer validates the packet and decodes the IP/UDP header fields. Since the IP/UDP headers are static throughout the VoLTE call and due to the processing of TCP/IP layer and ROHC redundant processing, there is a delay in receiving audio data. Further, this redundant processing consumes power cycles in the UE.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system for handling audio packets in a Voice over Long Term Evolution (VoLTE) call by a User Equipment (UE) when RObust Header Compression (ROHC) is enabled.

Another aspect of the present disclosure is to provide a method that ignores the validation of an Internet Protocol/User Datagram Protocol (IP/UDP) header of a Transmission Control Protocol/Internet Protocol (TCP/IP) layer and compresses the IP/UDP header and Real-time Transport Protocol (RTP) header by a ROHC compressor during UpLink (UL) data path.

Another aspect of the present disclosure is to provide a method in which a ROHC decompressor constructs the RTP header and ignores the construction of IP/UDP headers during DownLink (DL) data path.

In accordance with an aspect of the present disclosure, a method for handling RTP packets during a VoLTE call by a UE during a UL data path is provided. The method includes receiving the RTP packets from an audio application by a ROHC compressor in the UE, compressing at least one of an Internet Protocol (IP) header, a User Datagram Protocol (UDP) header and a RTP header by the ROHC compressor, and transmitting the ROHC compressed header and a payload to a Radio Access Network (RAN) during the UL data path.

In accordance with another aspect of the present disclosure, a method for handling RTP packets during a VoLTE call by a UE during a DL data path is provided. The method includes receiving a compressed ROHC packet from a RAN by a ROHC decompressor in the UE, constructing a RTP header a RTP payload from the received compressed ROHC packet by the ROHC decompressor, and sending the RTP header and the RTP payload to an audio application during the DL data path.

In accordance with another aspect of the present disclosure, a UE for handling RTP packets during a VoLTE call during a UL data path is provided. The UE includes an integrated circuit comprising a processor and a memory having a computer readable memory. The computer readable medium is configured to cause the processor to receive the RTP packets from an audio application by a ROHC compressor during the UL data path. The UE is further configured to compress at least one of an IP header, a UDP header and a RTP header by the ROHC compressor. Further, the UE is configured to send the ROHC compressed header and a payload to a RAN during the UL data path.

In accordance with another aspect of the present disclosure, a UE for handling RTP packets during a VoLTE call during a DL data path is provided. The UE includes an integrated circuit comprising a processor and a memory having a computer readable medium. The computer readable medium causes the processor to receive a compressed ROHC packet from a RAN by a ROHC decompressor. Further, the UE is configured to construct a RTP header and a RTP payload from the received compressed ROHC packet by the ROHC decompressor and send the constructed RTP header and a RTP payload to an audio application during the DL data path.

Other aspects, advantages, and salient features of the disclosure will become apparent to those skilled in the art from the following detailed description, which, taken in conjunction with annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments herein achieve a method and system for handling audio packets during a Voice over Long Term Evolution (VoLTE) call, when a RObust Header Compression (ROHC) scheme is enabled.

During the VoLTE call, an audio engine or an audio application in a User Equipment (UE) generates audio packets every 20 ms. These audio packets are implemented as Real-time Transport Protocol (RTP) packets in VoLTE domain.

The audio packets are sent to Transmission Control Protocol/Internet Protocol (TCP/IP) layer in the UE during the UpLink (UL) data path. The TCP/IP layer stores the information of VoLTE call properties, which includes VoLTE call properties such as a Source Internet Protocol (IP) address, a Source Port, a Remote IP address, and a Remote Port.

In an embodiment, the TCP/IP layer provides the VoLTE call properties to the ROHC compressor. The TCP/IP layer receives the audio packets (RTP packets) from the audio engine and sends the RTP packets directly to the ROHC compressor without any validation of IP/UDP headers. Further, the ROHC compressor compresses the IP/UDP headers and RTP header.

The ROHC compressor then sends the compressed RTP data along with the payload to the network in the UL data path.

During DownLink (DL) data path, the ROHC decompressor in the UE receives the compressed ROHC packet from the network. The compressed ROHC packet comprises ROHC header and payload. The ROHC decompressor ignores the construction of IP/UDP headers for the compressed data.

In an embodiment, the ROHC decompressor constructs the RTP header and RTP payload and sends the constructed RTP header and RTP payload to the TCP/IP layer. The TCP/IP layer bypasses the validation of IP/UDP headers and sends the RTP packets to the audio engine of the UE during the DL data path.

The removal of processing IP/UDP headers during the VoLTE call provides a substantial gain in the battery of the UE and also reduces the end-to-end audio delay.

Referring now to the drawings and more particularly to FIGS. 1 through 6 where similar reference characters denote corresponding features consistently throughout the figures, there are shown various embodiments.

Figure 1:
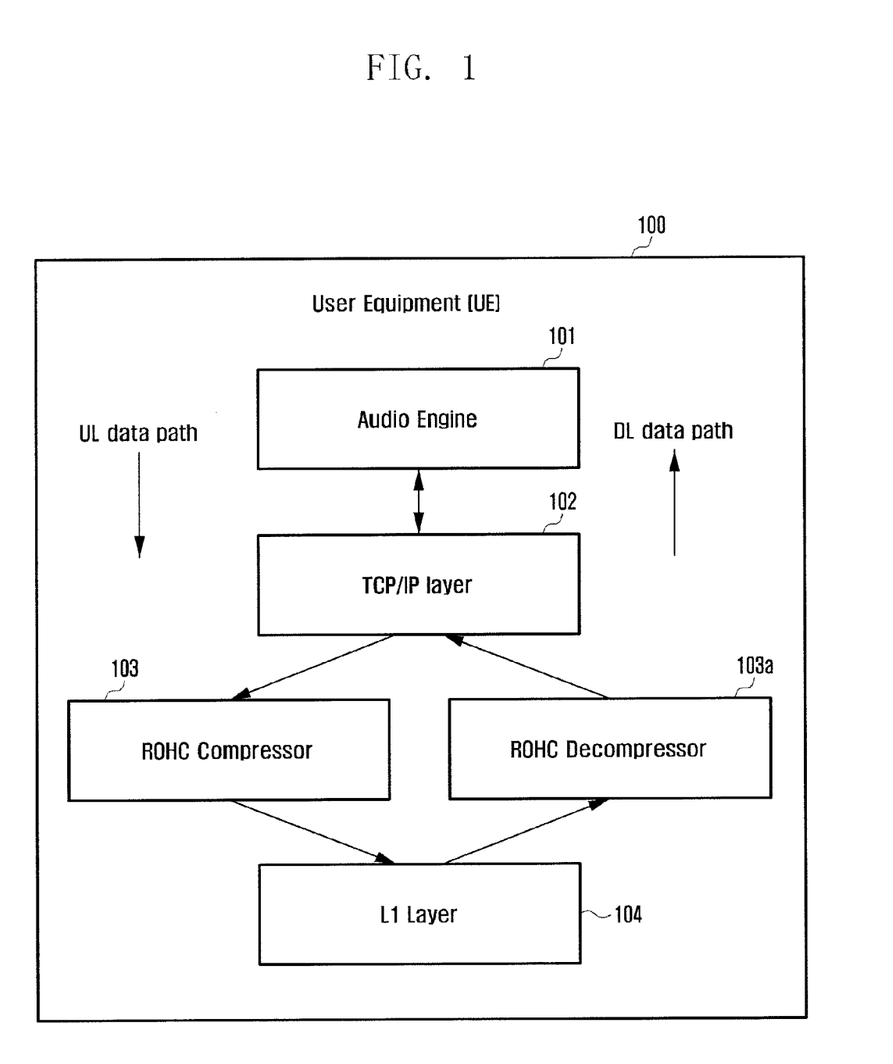
FIG. 1 illustrates flow of audio packets in a User Equipment (UE) for a Voice over Long Term Evolution (VoLTE) call during uplink and downlink data paths according to an embodiment of the present disclosure.

FIG. 1 illustrates flow of audio packets in a UE for a VoLTE call during uplink and downlink data paths according to an embodiment of the present disclosure.

Referring to FIG. 1, the UE 100 comprises an audio engine 101 in the application layer (not shown in the figure). The audio engine 101 is implemented in part in the application layer. The audio engine 101 sends or receives the audio data (i.e., RTP packets) to and from the TCP/IP layer 102 during the VoLTE call.

In general, during the VoLTE call, the TCP/IP layer 102 constructs the IP/UDP headers and forwards the audio data to the ROHC compressor 103.

The TCP/IP layer 102 with respect to various embodiments disclosed herein, ignores the construction of IP/UDP header in the audio data.

In an embodiment, the TCP/IP layer 102 skips adding IP/UDP headers to the audio data and directly sends the audio data to the ROHC compressor 103. The ROHC compressor 103 performs the compression of IP/UDP and RTP headers during the UL data path and sends the compressed audio data to a Radio Access Network (RAN).

In an embodiment, the ROHC compressor 103 compresses the IP/UDP headers from the values stored in a database of the ROHC compressor 103 during the UL data path.

In an embodiment, the ROHC compressor 103 compresses the RTP header from the received audio packets (i.e., RTP packets).

Further, the ROHC compressor 103 sends the ROHC compressed data along with the payload to the RAN through an L1 layer 104.

In the DL data path, the ROHC decompressor 103a receives the compressed ROHC packet from the RAN through the L1 Layer 104.

The ROHC decompressor 103a, in normal scenario during VoLTE call, constructs the IP/UDP header after decoding the ROHC compressed packet during the DL data path.

The ROHC decompressor 103a, with respect to various embodiments disclosed herein, ignores the construction of IP/UDP headers after decoding the ROHC compressed packet during the DL data path.

In an embodiment, the ROHC decompressor 103a constructs the RTP header and sends the constructed RTP header along with the payload to the TCP/IP layer 102.

In an embodiment, the TCP/IP layer 102 ignores the processing of IP/UDP headers and provides the RTP packets directly to the audio engine 101 during the DL data path.

Figure 2:
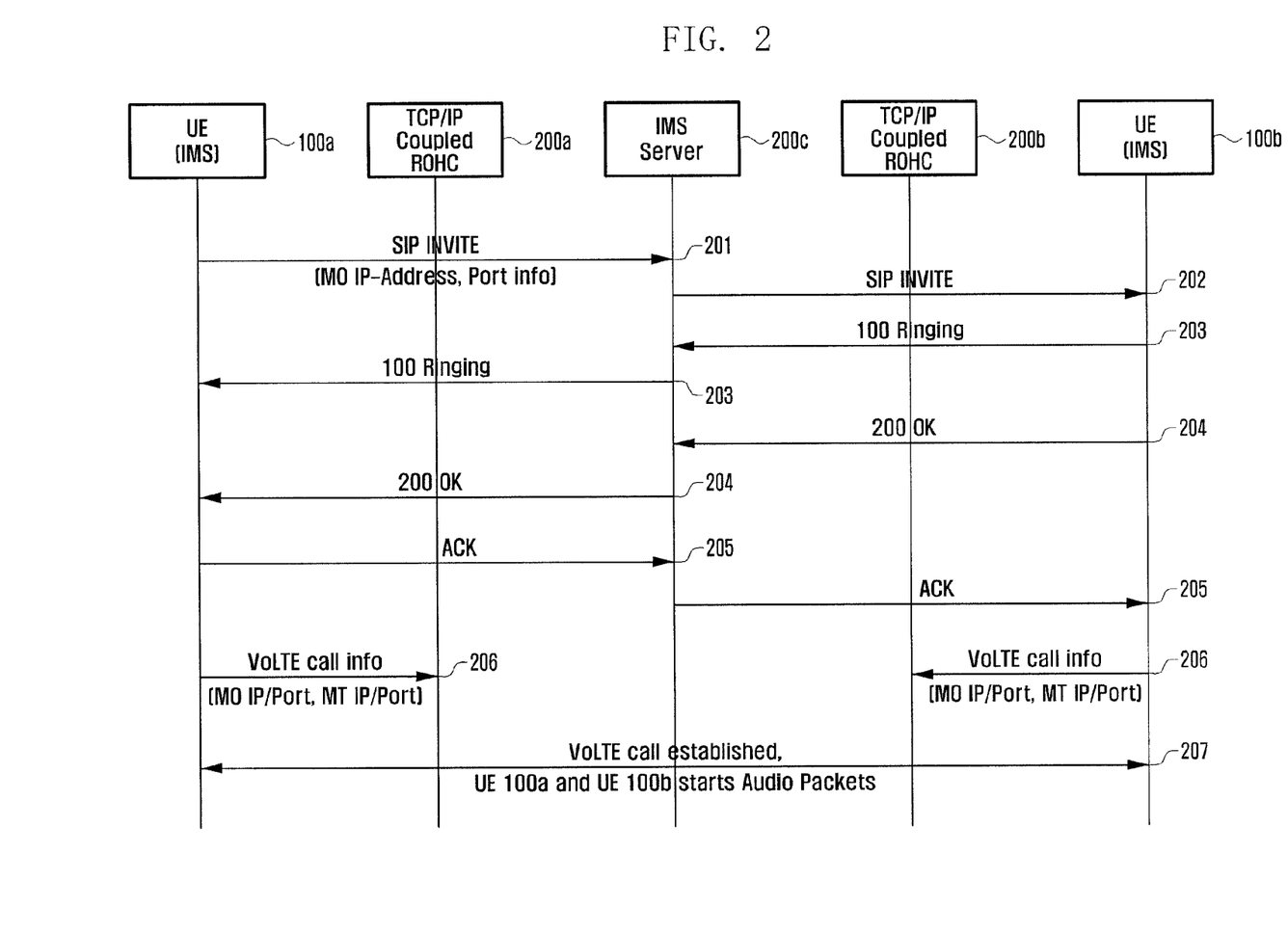
FIG. 2 illustrates a sequence diagram representing a VoLTE call establishment procedure according to an embodiment of the present disclosure.

FIG. 2 illustrates a sequence diagram representing a VoLTE call establishment procedure according to an embodiment of the present disclosure.

Referring to FIG. 2, the VoLTE call establishment procedure between the UE 100a and UE 100b, both having IP Multimedia Subsystem (IMS) capability, is depicted in the sequence diagram.

The UE 100a initiates the VoLTE call (Mobile Originating (MO) call) with the UE 100b (Mobile Terminating (MT) call). Initially, the UE 100a sends, at operation 201, a Session Initiation Protocol (SIP) INVITE message including the MO IP Address and port information to an IMS server 200c.

Further, the IMS server 200c receives the SIP INVITE message from the UE 100a and forwards, at operation 202, the SIP INVITE message to the UE 100b. In response to the SIP INVITE MESSAGE from the IMS server 200c, the UE 100b sends, at operation 203, a '100 Ringing' message to the IMS server 200c.

The IMS server 200c receives the '100 Ringing' message and forwards, at operation 203, the '100 Ringing' message to the UE 100a. Further, the UE 100b sends, at operation 204, a "200 OK" message including the MT IP Address and port information to the IMS server 200c.

Further, the IMS server 200c forwards, at operation 204, the "200 OK" message to the UE 100a. The UE 100a sends, at operation 205, an ACKnowledge (ACK) message to the IMS server 200c and this ACK message is forwarded, at operation 205, to the UE 100b through the IMS server 200c.

Further, the UE 100a sends, at operation 206, the properties of the VoLTE call (VoLTE call information) that includes the MO IP Address and port information, the MT IP address and the port information to the TCP/IP coupled ROHC 200a.

Similarly, the UE 100b sends, at operation 206, the properties of VoLTE call (VoLTE call information) that includes the MO IP address and port information and the MT IP address and port information to the TCP/IP coupled ROHC 200b. Once the UE 100a and UE 100b share the IP address and port information with their corresponding TCP/IP coupled ROHCs, the VoLTE call is established between the UE 100a and the UE 100b.

The UE 100a and UE 100b start the exchange of audio packets at operation 207 when the VoLTE call is established.

Figure 3:
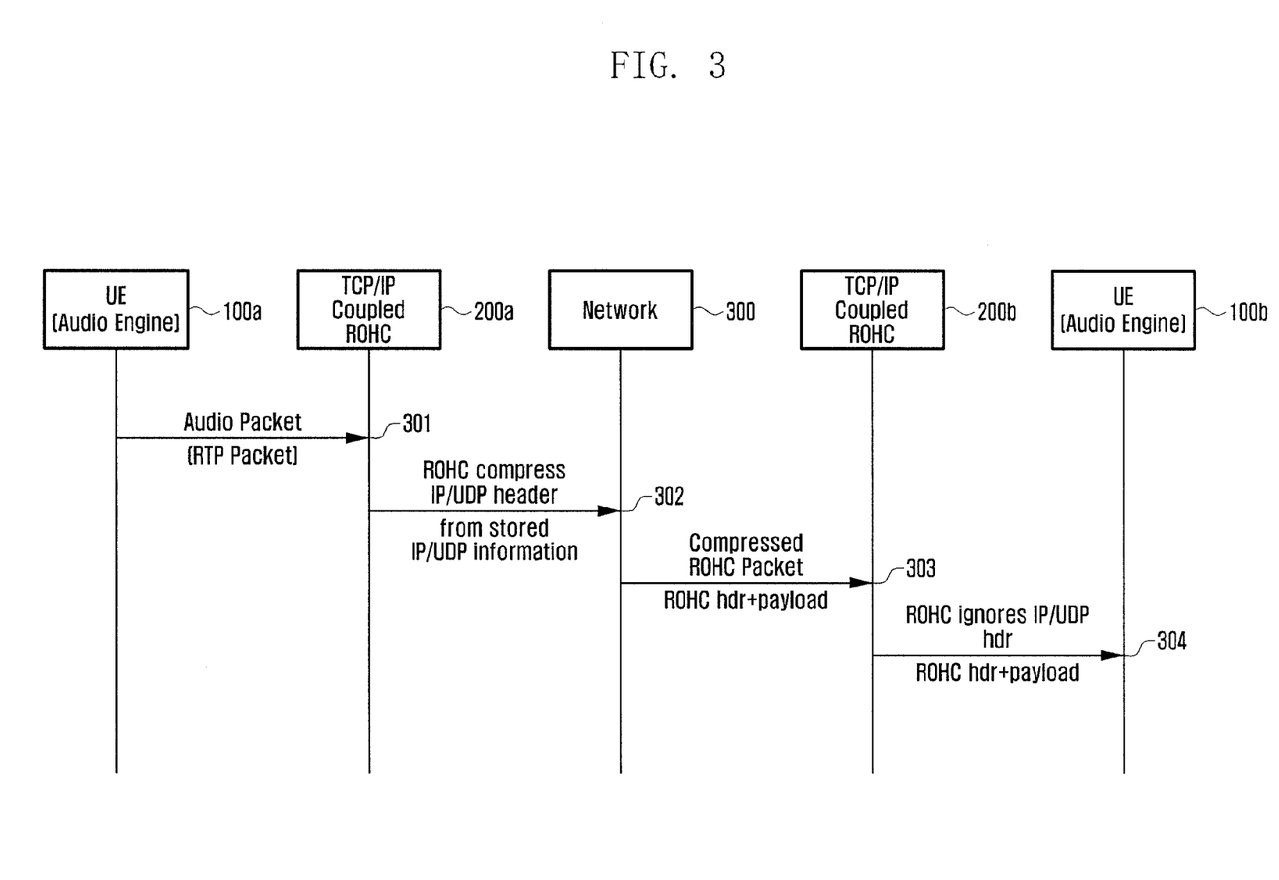
FIG. 3 illustrates a sequence diagram for VoLTE call flow in an UpLink (UL) data path according to an embodiment of the present disclosure.

FIG. 3 illustrates a sequence diagram for VoLTE call flow in a UL data path according to an embodiment of the present disclosure.

Referring to FIG. 3, in the UL data path, the TCP/IP coupled ROHC compressor 200a receives, at operation 301, audio packets from the audio engine at the UE 100a.

In an embodiment, the TCP/IP coupled ROHC compressor 200a receives the RTP packets from the audio engine 101 at the UE 100a.

The TCP/IP coupled ROHC compressor 200a compresses, at operation 302, IP/UDP headers to the audio data. In an embodiment, the TCP/IP ROHC compressor 200a compresses the IP/UDP headers from the values stored in the database of the ROHC compressor 200a Further, the TCP/IP coupled ROHC compressor 200a compresses the RTP header from the received audio data (i.e., RTP packets).

In an embodiment, the TCP/IP coupled ROHC compressor 200a sends a compressed ROHC packet with IP/UDP header and RTP header along with payload to the network 300.

The network 300 sends, at operation 303, the compressed ROHC packet that includes compressed ROHC header and payload to the TCP/IP coupled ROHC 200b at the UE 100b.

The TCP/IP coupled ROHC decompressor 200b at the UE 100b ignores, at operation 304, the construction of IP/UDP headers.

In an embodiment, the TCP/IP coupled ROHC decompressor 200b constructs RTP header and payload from the received ROHC compressed packet.

The TCP/IP coupled ROHC decompressor 200b sends the RTP packets to the audio engine at the UE 100b during the UL data path.

Figure 4:
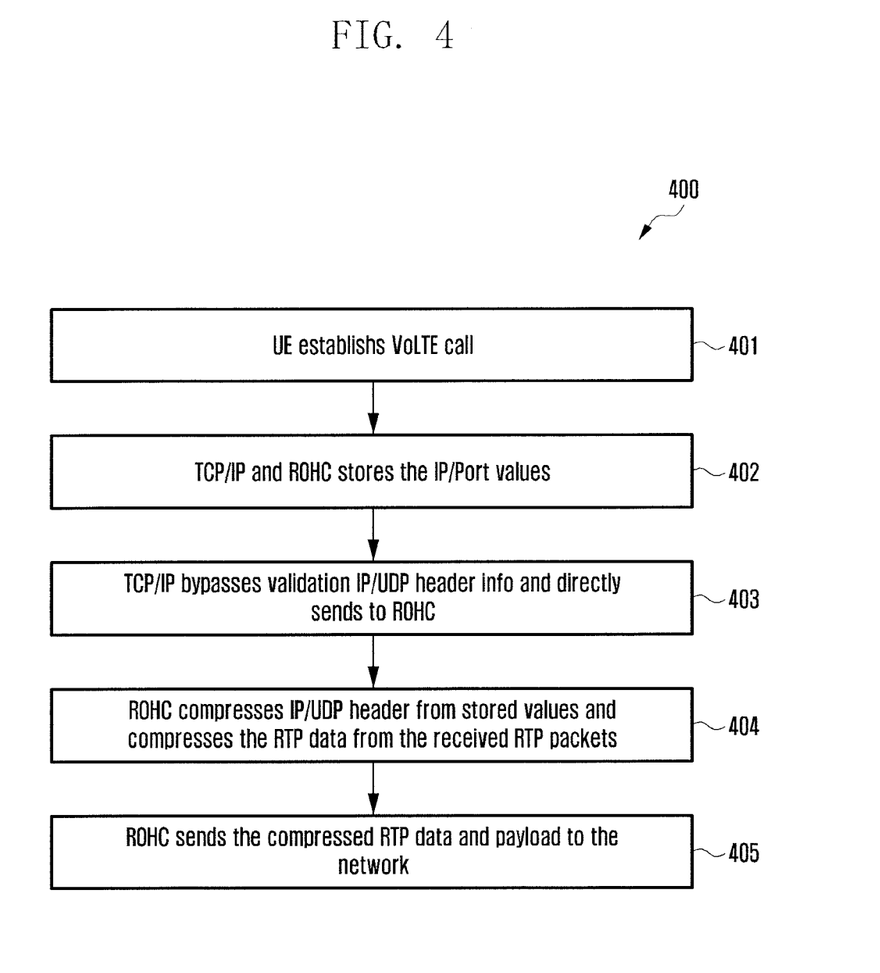
FIG. 4 illustrates a flow diagram explaining various steps involved in handling Real-time Transport Protocol (RTP) packets during a UL data path according to an embodiment of the present disclosure.

FIG. 4 illustrates a flow diagram explaining various steps involved in handling RTP packets during a UL data path according to an embodiment of the present disclosure.

Referring to FIG. 4, as depicted in the flow diagram 400, the UE 100 initiates, at operation 401, a VoLTE call.

During the VoLTE call, the audio engine 101 in the UE 100 generates audio packets every 20 ms. These audio packets are standardized as RTP packets in the VoLTE domain.

The audio packets generated by the UE 100 are sent to TCP/IP layer 102 in the UE 100. The TCP/IP layer 102 stores, at operation 402, the information of VoLTE call properties. The information of VoLTE call properties includes a Source IP address, a Source port, a Remote IP address, and a remote Port.

In an embodiment, the TCP/IP layer provides the VoLTE call properties to the ROHC compressor 103. The TCP/IP layer 102 receives the audio packets (RTP packets) from the audio engine 101 and sends the RTP packets directly to the ROHC compressor.

In an embodiment, the TCP/IP layer 101 bypasses, at operation 403, the validation of TCP/IP headers of the audio packets and sends the audio packets directly to the ROHC compressor 102.

The ROHC compressor 102 receives the RTP packets from the TCP/IP layer 101 and compresses, at operation 404, the IP/UDP headers and RTP header.

In an embodiment, the ROHC compressor 102 compresses the IP/UDP headers from the values stored in the database of the ROHC compressor 102.

In an embodiment, the ROHC compressor compresses the RTP header from the received RTP packets from the TCP/IP layer 101.

Further, the ROHC compressor 102 sends, at operation 405, the compressed RTP data along with the payload to the network 300. The various actions in flow diagram 400 may be performed in the order presented, in a different order or simultaneously. Further, in other embodiments, some operations listed in FIG. 4 may be omitted.

Figure 5:
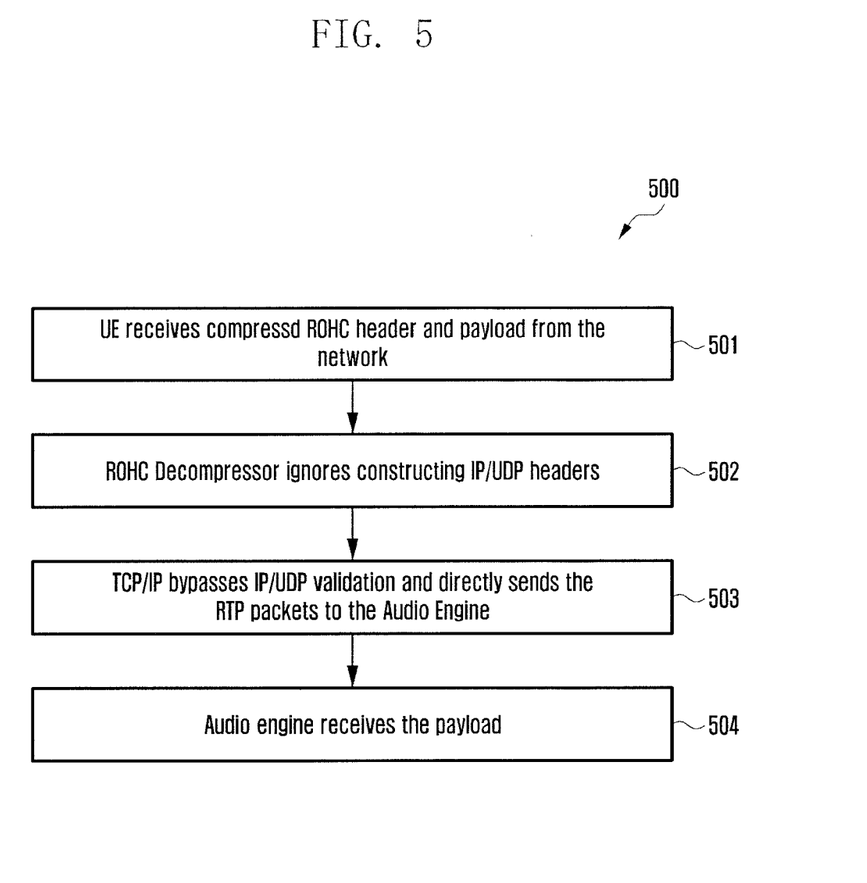
FIG. 5 illustrates a flow diagram explaining handling the RTP packets during a DownLink (DL) data path according to an embodiment of the present disclosure.

FIG. 5 illustrates a flow diagram explaining various steps involved in handling RTP packets during a DL data path according to an embodiment of the present disclosure.

Referring to FIG. 5, as depicted in the flow diagram 500, during the DL data path, the UE 100 receives, at operation 501, the compressed ROHC header and the payload from the network 300 through the ROHC decompressor 103a. When the ROHC decompressor 103a receives the ROHC header and payload from the network 300, the ROHC decompressor 103a ignores, at operation 502, the construction of IP/UDP headers for the compressed data.

In an embodiment, the ROHC decompressor 103a constructs the RTP header and RTP payload from the ROHC compressed data received from the network 300.

Further, the ROHC decompressor sends the RTP header and RTP payload to the TCP/IP layer 102. The TCP/IP layer 102 bypasses, at operation 503, the validation of IP/UDP headers and sends the RTP packets to the audio engine 101.

Finally, the audio engine of the UE 100 receives, at operation 504, the RTP packets from the TCP/IP layer in the DL data path. The various actions in flow diagram 500 may be performed in the order presented, in a different order or simultaneously. Further, in other embodiments, some operations listed in FIG. 5 may be omitted.

Figure 6:
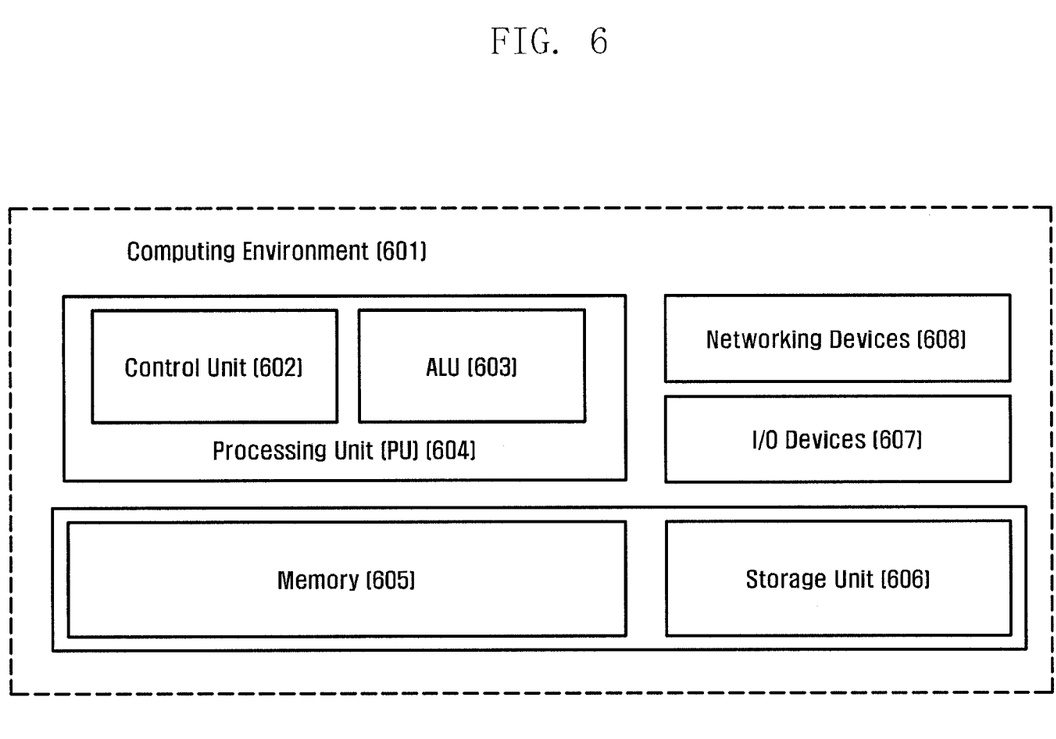
FIG. 6 illustrates a block diagram of a computing environment for handling RTP packets during a VoLTE call by a UE according to an embodiment of the present disclosure.

FIG. 6 illustrates a block diagram of a computing environment for handling RTP packets during a VoLTE call by a UE according to an embodiment of the present disclosure.

Referring to FIG. 6, the computing environment 601 comprises at least one processing unit 604 that includes a control unit 602 and an Arithmetic Logic Unit (ALU) 603, a memory 605, a storage unit 606, a plurality of networking devices 608, and a plurality Input/Output (I/O) devices 607. The processing unit 604 is responsible for processing the instructions of the algorithm. The processing unit 604 receives commands from the control unit in order to perform its processing. Further, any logical and arithmetic operations involved in the execution of the instructions are computed with the help of the ALU 603.

The overall computing environment 601 can be composed of multiple homogeneous and/or heterogeneous cores, multiple Central Processing Units (CPUs) of different kinds, special media control units, and other accelerators. The processing unit 604 is responsible for processing the instructions of the algorithm. Further, the plurality of processing units 604 may be located on a single chip or over multiple chips.

The algorithm comprising instructions and codes required for the implementation is stored in either the memory unit 605 or the storage 606 or both. At the time of execution, the instructions may be fetched from the corresponding memory 605 and/or storage 606, and executed by the processing unit 604.

In case of any hardware implementations various networking devices 608 or external I/O devices 607 may be connected to the computing environment to support the implementation through the networking unit and the I/O device unit.

Various embodiments disclosed herein can be implemented through at least one software program running on at least one hardware device and performing network management functions to control the elements. The elements shown in FIGS. 1, 2, 3, and 6 include blocks which can be at least one of a hardware device, or a combination of hardware device and software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for handling Real-time Transport Protocol (RTP) packets during a Voice over Long Term Evolution (VoLTE) call by a User Equipment (UE) during an UpLink (UL) data path, the method comprising:
transmitting VoLTE call information to a Robust Header Compression (ROHC) compressor;
receiving the RTP packets from an audio application by the ROHC compressor in the UE;
compressing at least one of an Internet Protocol (IP) header and a User Datagram Protocol (UDP) header based on the VoLTE call information by the ROHC compressor;
compressing a RTP header by the ROHC compressor; and
transmitting a ROHC packet to a terminating UE over a Radio Access Network (RAN) during the UL data path,
wherein the ROHC packet includes a payload, information associated with the RTP header, and information associated with at least one of the IP header and the UDP header, and
wherein the terminating UE ignores the information associated with the at least one IP header and the UDP header in the ROHC packet.

2. The method of claim 1,
wherein the VoIP call information includes at least one of an IP address associated with the UE, port information associated with the UE, an IP address associated with the terminating UE, and port information associated with the terminating UE, and
wherein a Transmission Control Protocol/Internet Protocol (TCP/IP) layer ignores the information associated with the at least one IP header and the UDP header in the ROHC packet during the UL data path based on the VoLTE call information.

3. The method of claim 2, wherein the TCP/IP layer ignores at least one of the IP header and the UDP header before the transmitting of the received RTP packets to the ROHC compressor during the UL data path.

4. The method of claim 1, wherein the ROHC compressor compresses the RTP header based on information associated with the received RTP packets during the UL data path.

5. A method for handling Real-time Transport Protocol (RTP) packets during a Voice over Long Term Evolution (VoLTE) call by a User Equipment (UE) during a DownLink (DL) data path, the method comprising:
transmitting VoLTE call information to a Robust Header Compression (ROHC) decompressor;
receiving a ROHC packet from a Radio Access Network (RAN) by the ROHC decompressor in the UE, the ROHC packet including a RTP payload, information associated with a RTP header, and information associated with at least one of an IP header and a UDP header;
constructing the RTP header and the RTP payload from the received ROHC packet by the ROHC decompressor,
bypassing validation of at least one of the IP header and the UDP header of the ROHC packet; and
sending the RTP header and the RTP payload to an audio application during the DL data path after the validation of at least one of the IP header and the UDP header of the ROHC packet is bypassed.

6. The method of claim 5,
wherein the bypassing of the validation comprises ignoring construction of at least one of the IP header and the UDP header after decoding a ROHC header of the ROHC packet by the ROHC decompressor during the DL data path, and wherein the method further comprises:
sending the RTP header along with the RTP payload to a Transmission Control Protocol/Internet Protocol (TCP/IP) layer by the ROHC decompressor; and
sending the RTP header and the RTP payload to the audio application from the TCP/IP layer during the DL data path.

7. A User Equipment (UE) for handling Real-time Transport Protocol (RTP) packets during a Voice over Long Term Evolution (VoLTE) call during an UpLink (UL) data path, the UE comprising:
an integrated circuit comprising a processor; and
a memory having a computer readable medium,
wherein the computer readable medium is configured to cause the processor to:
transmit VoLTE call information to a Robust Header Compression (ROHC) compressor;
receive the RTP packets from an audio application by the ROHC compressor during the UpLink (UL) data path;
compress at least one of an Internet Protocol (IP) header and a User Datagram Protocol (UDP) header based on the VoLTE call information by the ROHC compressor;
compress a RTP header by the ROHC compressor; and
send a ROHC packet to a terminating UE over a Radio Access Network (RAN) during the UL data path,
wherein the ROHC packet includes a payload, information associated with the RTP header, and information associated with at least one of the IP header and the UDP header, and
wherein the terminating UE ignores the information associated with at least one IP header and the UDP header in the ROHC packet.

8. The UE of claim 7,
wherein the VoIP call information includes at least one of an IP address associated with the UE, port information associated with the UE, an IP address associated with the terminating UE, and port information associated with the terminating UE, and
wherein a Transmission Control Protocol/Internet Protocol (TCP/IP) layer ignores the information associated with at least one of the IP header and the UDP header in the ROHC packet during the UL data path based on the VoLTE call information.

9. The UE of claim 8, wherein the TCP/IP layer ignores at least one of the IP header and the UDP header before sending the received RTP packets to the ROHC compressor during the UL data path.

10. The UE of claim 7, wherein the ROHC compressor is further configured to compress the RTP header based on information associated with the received RTP packets during the UL data path.

11. A User Equipment (UE) for handling Real-time Transport Protocol (RTP) packets during a Voice over Long Term Evolution (VoLTE) call during a DownLink (DL) data path, the UE comprising:
an integrated circuit comprising a processor; and
a memory having a computer readable medium,
wherein the computer readable medium is configured to cause the processor to:
transmit VoLTE call information to a Robust Header Compression (ROHC) decompressor;
receive a ROHC packet from a Radio Access network (RAN) by the ROHC decompressor, the ROHC packet including a RTP payload, information associated with a RTP header, and information associated with at least one of an Internet Protocol (IP) header and a User Datagram Protocol (UDP) header;
construct the RTP header and the RTP payload from the received ROHC packet by the ROHC decompressor;
bypassing validation of at least one of the IP header and the UDP header of the ROHC packet; and
send the constructed RTP header and the RTP payload to an audio application during the DL data path after the validation of at least one of the IP header and the UDP header of the ROHC packet is bypassed.

12. The UE as in claim 11,
wherein the bypassing of the validation comprises ignoring construction of at least one of the IP header and the UDP header after decoding a ROHC header of the ROHC packet during the DL path, and
the ROHC decompressor is further configured to:
send the constructed RTP header and the RTP payload to a Transmission Control Protocol/Internet Protocol (TCP/IP) layer, and
send the constructed RTP header and the RTP payload to the audio application during the DL data path.

13. A system for handling Real-time Transport Protocol (RTP) packets during a Voice over Long Term Evolution (VoLTE) call, the system comprising:
a User Equipment (UE) having a Robust Header Compression (ROHC) compressor and a ROHC decompressor, the UE configured to transmit VoLTE call information to at least one of the ROHC compressor and the ROHC decompressor; and
a Radio Access Network (RAN),
wherein the ROHC compressor is configured to:
receive the RTP packets from an audio application,
compress at least one of an Internet Protocol (IP) header and a User Datagram Protocol (UDP) header based on the VoLTE call information,
compress a RTP header, and
transmit a ROHC packet to a terminating UE over the RAN, the ROHC packet including a payload, information associated with the RTP header, and information associated with at least one of the IP header and the UDP header, and
wherein the ROHC decompressor is configured to:
receive the ROHC packet from the RAN,
construct a RTP header and a RTP payload from the received ROHC packet,
bypass validation of at least one of the IP header and the UDP header of the ROHC packet, and
send the RTP header and the RTP payload to an audio application after the validation of at least one of the IP header and the UDP header of the ROHC packet is bypassed.

14. The system of claim 13, wherein the VoLTE call information comprises at least one of an IP address associated with the UE, port information associated with the UE, an IP address associated with a terminating UE, and port information associated with the terminating UE.

15. The system of claim 13, wherein a Transmission Control Protocol/Internet Protocol (TCP/IP) layer is configured to ignore at least one of the IP header and the UDP header before transmitting the received RTP packets to the ROHC compressor.

16. The method of claim 13,
- wherein the ROHC compressor stores the VoLTE call information in a database,
- wherein the ROHC compressor compresses one of the IP header and the UDP header based on the VoLTE call information stored in the database of the ROHC compressor, and
- wherein the ROHC compressor compresses the RTP header based on the received RTP packets during the UL data path.

17. The method of claim 13,
- wherein the ROHC decompressor bypasses the validation of the at least one of the IP header and the UDP header by ignoring construction of at least one of the IP header and the UDP header after decoding a ROHC header of the ROHC packet by the ROHC decompressor, and
- wherein the ROHC decompressor sends the RTP header with the RTP payload to a Transmission Control Protocol/Internet Protocol (TCP/IP) layer to the audio application after the validation of at least one of the IP header and the UDP header of the ROHC packet is bypassed.

\* \* \* \* \*